(12) United States Patent
Steininger et al.

(10) Patent No.: US 7,579,082 B2
(45) Date of Patent: Aug. 25, 2009

(54) FILMS COATED WITH PAINT

(75) Inventors: Helmut Steininger, Worms (DE); Ria Kress, Ludwigshafen (DE); Erich Beck, Ladenburg (DE); Rainer Koeniger, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 849 days.

(21) Appl. No.: 10/485,818

(22) PCT Filed: Aug. 14, 2002

(86) PCT No.: PCT/EP02/09104

§ 371 (c)(1),
(2), (4) Date: Feb. 11, 2004

(87) PCT Pub. No.: WO03/018214

PCT Pub. Date: Mar. 6, 2003

(65) Prior Publication Data

US 2004/0208998 A1    Oct. 21, 2004

(30) Foreign Application Priority Data

Aug. 20, 2001 (DE) ............................. 101 40 769

(51) Int. Cl.
*B32B 9/04* (2006.01)
*B32B 27/32* (2006.01)

(52) U.S. Cl. .................... 428/411.1; 428/461; 428/523; 428/220

(58) Field of Classification Search ................ 428/412, 428/411.1, 461, 523, 220
See application file for complete search history.

(56) References Cited

U.S. PATENT DOCUMENTS 6,254,712 B1 * 7/2001 Enlow et al. ............ 156/244.11
2004/0208998 A1 10/2004 Steininger et al.

FOREIGN PATENT DOCUMENTS

DE        197 09 467      10/1998
EP        0 361 351       4/1990

OTHER PUBLICATIONS

U.S. Appl. No. 10/501,072, filed Jul. 9, 2004, Fink et al.
U.S. Appl. No. 10/519,841, filed Apr. 12, 2005, Dietsche, et al.

* cited by examiner

*Primary Examiner*—Thao T. Tran
(74) *Attorney, Agent, or Firm*—Oblon, Spivak, McClelland, Maier & Neustadt, P.C.

(57) ABSTRACT

The present invention relates to films which are coated with at least two paint coats (2) (3), whereby the backing film (1) is coated with at least one radiation-hardenable paint coat (2) and at least one second paint coat (3), which can harden at least partially without radiation. The invention also relates to a method for producing said films and to their use for coating steel, aluminium and plastic substrates.

20 Claims, 4 Drawing Sheets

FILMS COATED WITH PAINT

The present invention relates to films coated with at least two paint layers, to a process for producing the films, and to their use.

With the nowadays customary wet-chemical finishing by way of spraying techniques it is extremely difficult to produce matching-color coatings on different substrates such as steel, aluminum, and plastic. The motor vehicle industry in particular is therefore interested in developing new finishing technologies for this area.

Films are being discussed as a long-term alternative to the conventional wet finishing. Coating with films can both economically and environmentally be an interesting future technology as an alternative to wet finishing. Paint from the roll, guaranteeing consistent color quality, enables a modular, site-independent production regime to be implemented, with corresponding cost savings in manufacture. With the film coating of rail vehicles as well there are savings: for example, the application of multicolor contrast stripes requires for each color the operations of masking, spraying, and drying for 1 to 2 days. This entails expensive factory standing times. Through the direct lamination of colored paint film stripes it is possible to reduce significantly the standing times and the labor involved. As well as economic aspects there are environmental incentives as well: no emission problems with solvent in the painting plant, and eco-friendly coating through solvent recycling in the coating operation.

In the prior art a variety of possible solutions have already been discussed. For instance, EP-A-374551 discloses coated substrates suitable for producing body-mounted components for automobile bodies. The coated substrates described in EP-A-374551 consist of metal sheets finished with at least one paint layer or of composites whose surface layer is composed of the painted metal sheets. DE-4424290.9-A1 discloses, further, substrates coated with two or more layers. These substrates are deformed and processed further with the aid, where appropriate, of additional materials. In this way it is possible to produce body-mounted components for vehicle bodies.

Films coated with coating materials are also described in EP 0395226, EP 0361823, U.S. Pat. No. 5,268,215, U.S. Pat. No. 6,063,230, DE 19526478 A1, and DE 3042156 A1.

A very wide variety of materials have been conceived as carrier films. From DE-4319519 A1, U.S. Pat. No. 4,933,237, and EP 0285071, for example, the use of polyester films is known.

Thermal coating materials are extensively used for the coating of the carrier films. However, coating materials curable with UV radiation have also been trialed. Such materials are described in, for example, DE 19535935 A1 and DE 4439350 A1.

Different adhesion promoters have been described for the application of the carrier films: reference may be made in this context, for example, to DE 4319519 A1 and U.S. Pat. No. 4,933,237.

The coated films known to date have a variety of drawbacks. These concern in particular the thermoformability and the consistency of shade. Problems are also presented by the joining of the individual paint layers and the adhesion to the substrate. Finally, in terms of mechanical stability, the film paints have not to date been able to match conventional spray paints.

That is, the requirements in terms of fracture resistance, scratch resistance, chemical resistance, and weathering stability have not to date been met by the coated films. It has likewise not been possible so far to produce metallic effects in spray paint quality.

It is an object of the present invention, accordingly, to provide films coated with at least two paint layers, constituting a useful alternative to the hitherto customary liquid paints. The cold formability and thermoformability of the films and the consistency of shade, in particular, ought to be ensured. Additionally, improved adhesion of the individual paint layers ought to be achieved. Finally, in terms of the mechanical strength, and in particular with regard to the fracture resistance, an improvement ought to be obtained over the prior art. At the same time the paint layers ought to exhibit scratch resistance, chemical resistance, and weathering stability comparable with those of the existing liquid paints. An objective of the invention, moreover, is to produce metallic effects in a quality which matches that of the existing spray paint. Finally, it is an object of the invention to produce films which can be removed again without residues.

The inventive solution are films coated with at least two paint layers, wherein a carrier film bears at least one first paint layer, which is radiation-curable, and at least one second paint layer, which is curable at least partly without radiation exposure. The second paint layer is therefore preferably at least partly thermally curable.

The radiation-curable paints are used particularly for the first paint layer. Preference is given to using radiation-curable clearcoat paints. It is also possible, however, to color and/or to pigment the clearcoat paints.

Clearcoat paints used are compositions curable with high-energy radiation, such as UV radiation or electron beams, especially UV radiation. A key constituent of such clearcoat paints is at least one radiation-curable oligomeric or polymeric binder.

The oligomers or polymers used as binders usually have a number-average molecular weight of from 500 to 50 000, preferably from 1 000 to 5 000. They preferably have a double bond equivalent weight of from 300 to 2 000, more preferably from 400 to 900. Furthermore, the fully formulated binders have a viscosity at 23° C. of preferably from 250 to 11 000 mPas. They are preferably employed in an amount of from 5 to 50% by weight, more preferably from 6 to 45% by weight, more preferably still from 7 to 40% by weight, very preferably from 8 to 35% by weight, and in particular from 9 to 30% by weight, based in each case on the solids of the clearcoat paint.

Examples of suitable binders come from the oligomer and/or polymer classes of (meth)acryloyl-functional (meth)acrylic copolymers, polyether acrylates, polyester acrylates, polyesters, epoxy acrylates, urethane acrylates, amino acrylates, melamine acrylates, silicone acrylates, and phosphazene acrylates, and the corresponding methacrylates, as described in, for example, German patent DE 197 09 467 C1, page 4 line 36 to page 5 line 61. It is preferred to use binders free from aromatic structural units. Preference is therefore given to using urethane (meth)acrylates, phosphazene (meth)acrylates and/or polyester (meth)acrylates, more preferably urethane (meth)acrylates, especially aliphatic urethane (meth)acrylates.

The urethane (meth)acrylates are obtained by reacting a diisocyanate or polyisocyanate with a chain extender from the group consisting of diols/polyols and/or diamines/polyamines and/or dithiols/polythiols and/or alkanolamines and subsequently reacting the remaining free isocyanate groups with at least one hydroxyalkyl (meth)acrylate or hydroxyalkyl ester of other ethylenically unsaturated carboxylic acids.

The amounts of chain extenders, di- and/or polyisocyanates, and hydroxyalkyl esters are preferably chosen such that 1.) the equivalent ratio of the NCO groups to the reactive groups of the chain extender (hydroxyl, amino and/or mercaptyl groups) is between 4:1 and 1:2, preferably between 3:1 and 3:2, and
2.) the OH groups of the hydroxyalkyl esters of the ethylenically unsaturated carboxylic acids are present in a stoichiometric amount with respect to the remaining free isocyanate groups of the prepolymer formed from isocyanate and chain extender.

A further option is to prepare the urethane (meth)acrylates by first reacting some of the isocyanate groups of the diisocyanate or polyisocyanate with at least one hydroxyalkyl ester and subsequently reacting the remaining isocyanate groups with a chain extender. In this case too the amounts of chain extender, isocyanate, and hydroxyalkyl ester are chosen such that the equivalent ratio of the NCO groups to the reactive groups of the chain extender is between 4:1 and 1:2, preferably between 3:1 and 3:2, and the equivalent ratio of the remaining NCO groups to the OH groups of the hydroxyalkyl ester is 1:1. It will be appreciated that any forms intermediate between these two methods are also possible. For example, some of the isocyanate groups of a diisocyanate can first be reacted with a diol, then a further fraction of the isocyanate groups can be reacted with the hydroxyalkyl ester, after which the remaining isocyanate groups can be reacted with a diamine.

Flexibilization of the urethane (meth)acrylates is possible, for example, by reacting corresponding isocyanate-functional prepolymers or oligomers with relatively long-chain aliphatic diols and/or diamines, especially aliphatic diols and/or diamines having at least 6 carbon atoms. This flexibilization reaction can be conducted before or after the addition reaction of acrylic and/or methacrylic acid with the oligomers and/or prepolymers.

As examples of suitable urethane (meth)acrylates mention may be made, among others, of the following, commercially available, polyfunctional aliphatic urethane acrylates:

Crodamer® UVU 300 from Croda Resins Ltd., Kent, United Kingdom;

Genomer® 4302, 4235, 4297 or 4316 from Rahn Chemie, Switzerland;

Ebecryl® 284, 294, IRR 351, 5129 or 1290 from UCB, Drogenbos, Belgium;

Roskydal® LS 2989 or LS 2545 or V94-504 from Bayer AG, Germany;

Viaktin® VTE 6160 from Vianova, Austria; or

Laromer® 8861 from BASF AG and experimental modifications thereof.

The systems listed here are liquid as 100% formulations. The converse of this is the urethane acrylate system we use with preference which is solid in the 100% state, advantageous for storage and transport. Castable solutions are produced on site from the solid resin. Solvents suitable for this purpose include THF, acetone, MEK, and MIBK.

Hydroxyl-containing urethane (meth)acrylates are known from, for example, patent U.S. Pat. No. 4,634,602 A or U.S. Pat. No. 4,424,252 A.

One example of a suitable polyphosphazene (meth)acrylate is the phosphazene dimethacrylate from Idemitsu, Japan.

In addition, the clearcoat paints can comprise the additives, photoinitiators, and reactive diluents described in German patent DE 197 09 467 C1, page 5 line 62 to page 6 line 30, including additives such as light stabilizers, slip additives, polymerization inhibitors, flatting agents, defoamers, leveling agents, and film-forming auxiliaries.

In order to prevent the formation of bubbles due to excessively rapid solvent release during the drying operation it is possible with preference to add high boilers to the clearcoat paint. Their fraction can amount to from 5% to 60%, preferably from 10% to 30%. High boilers which can be used include dioxane, toluene, and ethyl acetate; butyl acetate is employed with preference.

The layer thickness of the clearcoat paints is from 1 µm to 400 am, preferable 5 µm to 100 µm, more preferably 15 µm to 60 µm. In principle the choice of layer thickness depends on the stretching of the film. The minimum layer thicknesses stated refer to the end product, i.e., a generally stretched film.

The paints which can be cured at least partly without radiation preferably comprise the color layers, which at the same time form the topcoat layer. Here it is also possible to employ the automotive refinish paints known from the prior art, on the basis of their good physical drying properties and ready availability.

Suitable refinish paints are one-component or multicomponent systems. Two-component systems comprise, as is known, at least one compound, in particular a binder, having isocyanate-reactive functional groups, such as thiol, hydroxyl, and primary and secondary amino groups, especially hydroxyl groups, and at least one polyisocyanate.

Examples of suitable binders are random, alternating and/or block, linear and/or branched and/or comb addition (co)polymers of ethylenically unsaturated monomers, or polyaddition resins and/or poly-condensation resins. For further details of these terms refer to Römpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation", and "polycondensation resins", and also pages 73 and 74, "binders".

Examples of suitable addition (co)polymers are (meth)acrylate (co)polymers or partially hydrolyzed polyvinyl esters, especially (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyetherpolyurethanes, especially polyester-polyurethanes.

Of these binders, the (meth)acrylate (co)polymers have particular advantages and are therefore used with particular preference.

Preparation processes for (meth)acrylate copolymers are described in European patent application EP 0 767 185 A1, German patent DE 22 14 650 B1 or DE 27 49 576 B1, and American patents U.S. Pat. No. 4,091,048 A1, U.S. Pat. No. 3,781,379 A1, U.S. Pat. No. 5,480,493 A1, U.S. Pat. No. 5,475,073 A1 or U.S. Pat. No. 5,534,598 A1 or in the standard work Houben-Weyl, Methoden der organischen Chemie, 4th edition, volume 14/1, pages 24 to 255, 1961. Suitable reactors for the copolymerization include the conventional stirred tanks, stirred tank cascades, tube reactors, loop reactors or Taylor reactors, as described in, for example, the patents and patent applications DE 1 071 241 B1, EP 0 498 583 A1 or DE 198 28 742 A1 or in the article by K. Kataoka in Chemical Engineering Science, volume 50, issue 9, 1995, pages 1409 to 1416.

The fraction of binders in the refinish paints may vary widely and is guided by the requirements of the case in hand. They are preferably employed in an amount of from 5 to 90% by weight, more preferably from 6 to 80% by weight, more preferably still from 7 to 70% by weight, very preferably from 8 to 60% by weight, and in particular from 9 to 50% by weight, based in each case on the solids of the refinish paint.

The polyisocyanates may have aliphatic, cycloaliphatic or aromatic parent structures. It is also possible, however, for at least two of these structures to be present in one polyisocyanate. For example, a polyisocyanate is considered aliphatic if its isocyanate groups are directly connected exclusively to aliphatic groups. Where the isocyanate groups are directly connected both to aliphatic and to cycloaliphatic groups, the polyisocyanate in question is an aliphatic-cycloaliphatic polyisocyanate.

Preference is given to using aliphatic, aliphatic-cycloaliphatic, cycloaliphatic, and aromatic polyisocyanates.

The aromatic polyisocyanates are preferably used when a certain yellowing tendency can be tolerated in the films of the invention. Where the absence of yellowing is very critical, on the other hand, it is preferred to use aliphatic, cycloaliphatic, and aliphatic-cyclo-aliphatic polyisocyanates.

Examples of suitable polyisocyanates are isocyanato-containing polyurethane prepolymers, which can be prepared by reacting polyols with an excess of aliphatic, aliphatic-cycloaliphatic, cycloaliphatic, and aromatic diisocyanates and are preferably of low viscosity.

Examples of suitable aromatic diisocyanates include tolylidene 2,4- or 2,6-diisocyanate, phenylene 1,2-, 1,3- or 1,4-diisocyanate, naphthylene 1,2-, 1,3- or 1,4-diisocyanate or di(4-isocyanatophen-1-yl)methane or -propane.

Examples of suitable aliphatic, cycloaliphatic, and aliphatic-cycloaliphatic diisocyanates are isophorone diisocyanate (i.e., 5-isocyanato-1-isocyanatomethyl-1,3,3- trimethylcyclohexane), 5-isocyanato-1-(2-iso-cyanatoeth-1-yl)-1,3,3-trimethylcyclohexane, 5-iso-cyanato-1-(3-isocyanatoprop-1-yl)-1,3,3-trimethylcyclo-hexane, 5-isocyanato-(4-isocyanatobut-1-yl)-1,3,3-trimethylcyclo-hexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, tri-methylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate, methylpentane diisocyanate (MPDI), nonane triisocyanate (NTI) or diisocyanates derived from dimer fatty acids, as sold under the commercial designation DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-iso-cyanatoprop-1-yl)cyclohexane, 1,2-, 1,4- or 1,3-bis(4-isocyanatobut-1-yl)cyclohexane or liquid bis(4-iso-cyanatocyclohexyl)methane with a trans/trans content of up to 30% by weight, preferably 25% by weight, and in particular 20% by weight, as described by patent applications DE 44 14 032 A1, GB 1220717 A1, DE 16 18 795 A1 or DE 17 93 785 A1, preferably isophorone diisocyanate, 5-isocyanato-1-(2-isocyanato-eth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl) cyclohexane, 1-isocyanato-2-(4-isocyanatobut-1-yl) cyclohexane or HDI, especially HDI.

It is also possible to use polyisocyanates (B) containing isocyanurate, biuret, allophanate, imino-oxadiazinedione, urethane, urea, carbodiimide and/or uretdione groups, prepared in conventional manner from the above-described diisocyanates. Examples of suitable preparation processes and polyisocyanates are known from, for example, patents CA 1,163,591 A, U.S. Pat. No. 4,419,513, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 or EP 0 531 820 A1 or are described in German patent application DE 100 05 228.2, unpublished at the priority date of the present specification.

Further suitable polyisocyanates include the adducts, described in German patent application DE 196 09 617 A1, of polyisocyanates with oxazolidines, dioxolanes, and dioxanes containing isocyanate-reactive functional groups, which still contain free isocyanate groups or are used in combination with other polyisocyanates.

The amount of polyisocyanates in the coating materials may vary very widely and is guided by the requirements of the case in hand, in particular by the amount of isocyanato-reactive groups in the constituents. The amount is preferably from 5 to 50% by weight, more preferably 6 to 45% by weight, more preferably still from 7 to 40% by weight, very preferably from 8 to 35% by weight, and in particular from 9 to 30% by weight, based in each case on the solids of the coating material of the invention.

The refinish paints further comprise constituents which render them radiation-curable.

Examples of suitable radiation-curable constituents are the above-described radiation-curable binders as used in the clearcoat paints. The radiation-curable binders may additionally contain the isocyanate-reactive functional groups described above.

Further examples of suitable radiation-curable constituents are isocyanato acrylates, which contain free isocyanate groups and groups containing double bonds.

Highly suitable double bonds are present in, for example, (meth)acrylate, ethacrylate, crotonate, cinnamate, vinyl ether, vinyl ester, ethenylarylene, dicyclopentadienyl, norbornenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference.

The isocyanato acrylates can be prepared by reacting the above-described polyisocyanates with compounds which have an isocyanate-reactive functional group and at least one group containing double bonds. Examples of suitable compounds of this kind are 2-hydroxyethyl acrylate, 2- and 3-hydroxypropyl acrylate, 2-, 3-, and 4-hydroxybutyl acrylate, reaction products thereof with epsilon-caprolactone, or allyl alcohol. For further details refer to European patent application EP 0 928 800 A1.

The refinish paints may further comprise at least one of the additives described in German patent application DE 199 20 799, page 7 line 6 to page 8 line 37.

Leveling agents are preferably added to the automotive refinish paints and to the clearcoat paints in order to achieve effective clearcoat/colorcoat wetting.

Examples of suitable leveling agents are described in Römpp Lexikon Lacke und Druckfarben, Georg Thieme Verlag, Stuttgart, N.Y., 1998, "leveling agents (assistants)", page 602, or in Johan Bieleman, "Lackadditive" [Additives for coatings], Wiley-VCH, Weinheim, N.Y., 1998, "6.1.2 commercial leveling additives" pages 177 to 181. Flurosurfactants are used with preference. Fluorosurfactants are commercial products and are sold, for example, by 3M under the brand name Fluorad® FC-171, -129, -170C, -430 or -431.

The pigmented paints which can be used with preference in accordance with the invention include those curable thermally and by means of radiation (dual cure systems, as they are known). In this case, first, an application of the liquid paints is made. At this stage they have a low viscosity. Thermal curing here produces an elastomeric coating which by subsequent crosslinking and radiation exposure can be crosslinked further.

In this way, for example, from the above-described isocyanate acrylates and the hydroxyl-containing binders it is possible first to produce a polyurethane network which is subsequently crosslinked, by exposure to radiation, to form polyurethane-polyacrylate.

The layer thicknesses after the stretching of the topcoat paints used in accordance with the invention are from 10 µm to 60 µm, preferably from 15 µm to 40 µm. As with the layer thickness of the clearcoat paints, the topcoat layer thickness depends on the chosen stretching.

For the radiation curing of the clearcoat layer and of the pigmented layer preferential consideration is given to electron beams and UV radiation. Curing with UV radiation is preferred according to the invention.

Where the dual cure systems are employed a particular advantage is the combination of the properties of a conventional 2-component system with a UV-crosslinking system. The elastomeric characteristics at room temperature achieve very good formability, while after radiation exposure effective crosslinking at the join with the clearcoat paint is obtained. Moreover, in the inventive combination of radiation-curable layer and at least partly radiation-curable layer, the layers described exhibit particular adhesion to one another, especially if the last-mentioned layer is a dual cure system. Nor is this adhesion lost under thermal or mechanical influences.

In the development of the subject matter of the invention the locating of suitable carrier films presented problems. Surprisingly it was found that especially good results are achieved with unoriented polypropylene films. These films are readily coatable on coating machines and, after the paint system has cured, can be detached from the carrier film. The formability is excellent. In accordance with the invention it has now surprisingly been found that, preferably at a carrier film thickness of 75 µm or less, both effective formability and adequate thermal stability are achieved. The invention accordingly uses carrier films which are preferably <100 µm, having more preferably a thickness >40 µm. Thicknesses of 50 µm to 70 µm are particularly preferred. Very particular preference attaches to 50 µm to 60 µm.

Problems with the thermal stability of the film to be coated can be reduced by using slip films. It is preferred here to use polyester films in a thickness of from 10 µm to 100 µm. From 18 µm to 75 µm are particularly preferred.

The carrier film coated with the paints can be used for coating a very wide variety of substrates. In accordance with the invention it is preferred here to apply the color layer to the substrate. Following full cure through exposure to actinic radiation, the outer, carrier film can be removed.

The bond to the substrate can be produced using adhesion promoters. In accordance with the invention it is preferred to use adhesives. In this context it is preferred in turn to use UV-curing adhesives. UV radiation is used here preferably for adjusting the adhesive properties. Adhesives of this kind are commercial products and are sold, for example, by BASF Aktiengesellschaft under the brand name Acronal® 258 UV. In this case the adhesive layer is preferably applied to a separate film and after UV coating to the topcoat layer. This method is especially advantageous if the topcoat layer is a dual cure system.

Where transparent substrates are used for actinic radiation, full crosslinking of the adhesives by means of radiation is possible. The adhesive properties are in this case adjustable preferably by preliminary crosslinking by means of actinic radiation. Adhesives suitable for this purpose are described, for example, in Römpp Chemie Lexikon, 9th edition, volume 3, Georg Thieme Verlag, Stuttgart, 1990, "Adhesives", pages 2252 to 2255. Of these adhesives, the radiation-curable adhesives based on (meth)acrylates or UP resins (cf. Römpp Lexikon Lacke und Druckfarben, Georg Thieme Verlag, Stuttgart, N.Y., 1998, "Unsaturated polyester resins", pages 591 and 592, or D. Stoye and W. Freitag (Editors), Paint, Coatings and Solvents, Wiley-VCH, Weinheim, N.Y., 2nd, completely revised edition, 1998, "2.8. Unsaturated Polyester Coatings, 2.8.1. Unsaturated Polyester Binders", pages 57 to 58) and styrene and/or (meth)acrylates are of advantage and are therefore used with preference. It is also possible for the radiation-curable adhesives to include the radiation-curable constituents described above.

UV systems require reinforcing sheets coated on both sides. Conventional pressure-sensitive adhesives can be applied directly to the topcoat layer.

The thickness of the adhesives is preferably between 4 µm and 20 µm.

The reinforcing sheet is preferably applied to the adhesive present on the pigmented paint layer. Given appropriate reactivity of the reinforcing sheet, by adhesion promoters, for example, the adhesive layer can be omitted. The outer face of the reinforcing sheet is preferably provided in turn with an adhesive. Up until processing, this adhesive can be lined with a removable release film.

With the existing adhesives, the removal of the paint films causes problems. Depending on manufacturer, there is a requirement that the coated films be removable again from the substrate without residue even after four years.

Complete reremovability can be achieved in accordance with the invention, surprisingly, by virtue of the additional reinforcing sheet. In accordance with the invention this sheet has a thickness of preferably between 20 µm and 50 µm. From 20 µm to 30 µm are particularly preferred. A preferred material is polypropylene.

An adhesive may be applied to the second paint layer. It can be poured on, laminated or transferred. Atop it it is possible for there to be applied a further film having a preferred thickness of ≦1000 µm, preferably ≦500 µm.

The paint film is cold-formable (deep-drawable) and can therefore be drawn onto any structured area at room temperature or, where appropriate, with slight heating in order to facilitate operation. The films coated in accordance with the invention achieve thermoformability if a further film is laminated onto the adhesive layer present on the pigmented paint layer. Such further films are generally relatively thick films. The invention prefers films from 300 µm to 1 000 µm. From 400 µm to 700 µm are particularly preferred. Particularly suitable for this purpose are ASA, ABS, and ASA-PC.

Stable 3D structures can be produced from the assembly by thermoforming. A prerequisite for this is effective drying of the laminate. The surface properties of gloss, metallic, and flop effects are unaffected by forming.

The present invention also relates to a process for producing the abovementioned coated films. In this process the individual paint layers can be applied either in succession or, preferably, by means of approximate simultaneous coating. In the latter process the layers are applied directly wet on wet at short intervals of time. Thereafter the system is dried thermally in a drying tunnel. The purpose of drying is, in particular, to remove the solvent.

The coated films produced in accordance with the invention can be employed wherever substrates require painting. Substrates of steel, aluminum, and plastic, in particular, can be coated. One preferred sphere of application is the motor vehicle industry. For rail vehicles as well, however, i.e., locomotives and cars, the system of the invention can be used to good effect. The scope of use embraces contrast stripes through to full coating systems. A particular advantage here is the possibility of removing the paint films again. Indeed, in that way, it is possible to produce new partial coatings of the vehicles with particular ease. The removability is a further advantage in cases of vandalism, e.g., as a result of daubing or spraying with paint (graffiti). Furthermore, the carrier film can ensure protection of the paint surfaces until the end product has been produced. Thus, for example, ready-made bodywork parts can first of all be injection backmolded or foam-backed, with the carrier film being removed only after this operation is concluded.

In the text below the invention is described in more detail with reference to the figures.

Figure 1:
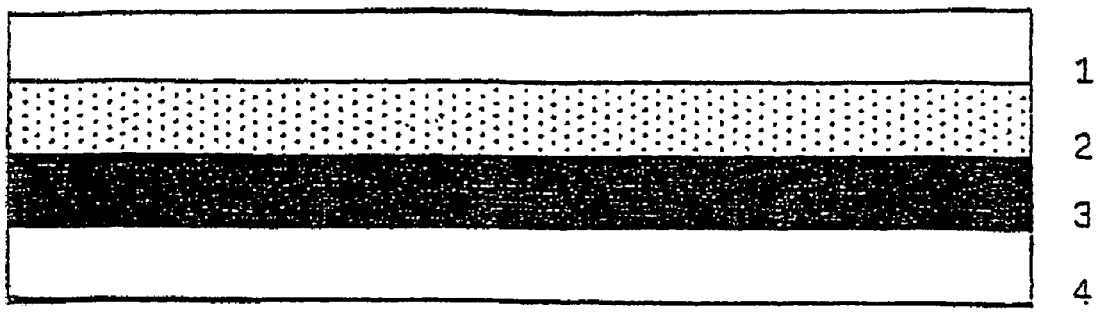
FIG. 1 shows a layer construction made up of carrier film, clearcoat paint, and color paint, and also an adhesive.

The coated film 1 depicted in FIG. 1 is composed of a polypropylene carrier film 50 μm thick, a clearcoat 2 40 μm thick, and a color coat 3 30 μm thick, and also an adhesive 4 20 μm thick. Tests have indicated that the formability of these coated films is excellent. At the same time the thermal stability is sufficient for production. With a drier gradient of 30° C./60° C./105° C., the running and winding behavior in the coating machine is good.

Figure 2:
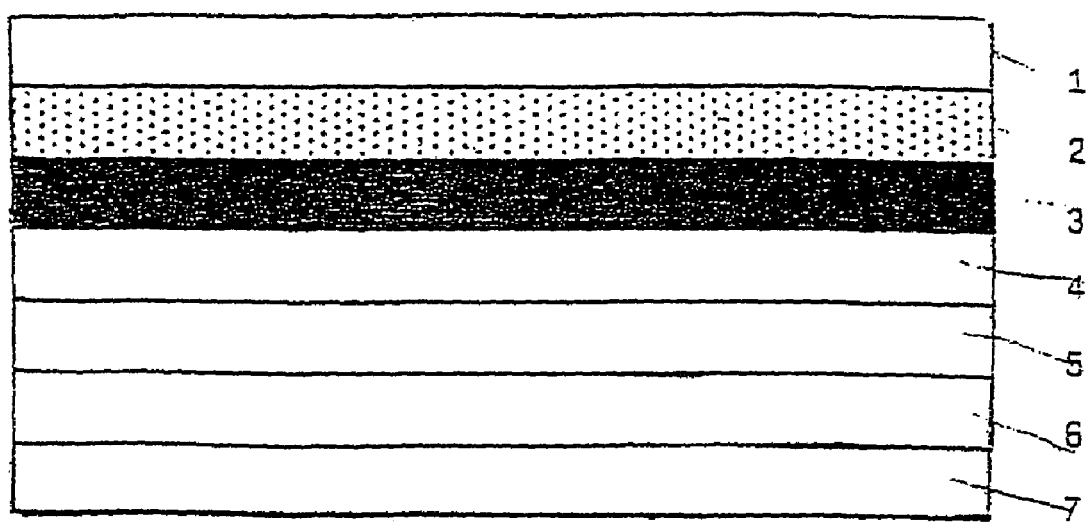
FIG. 2 shows a structure of an inventively coated film with reinforcing sheet.

The structure reproduced in FIG. 2 shows a polypropylene carrier film 1 50 μm thick, and also a UV clearcoat layer 2 40 μm thick, a color coat 3 30 μm thick, and an adhesive 4 20 μm thick. Laminated to this adhesive 4 is a reinforcing sheet 5 of from 25 μm to 50 μm. A further adhesive 6 20 μm thick is then used to laminate a removable release film 7.

UV Acronal adhesive (Acronal 248 UV, BASF) was used as adhesive 4 and 6. Tests have shown that the coated films adhere effectively at temperatures between −30° C. and +90° C. to substrates such as steel, aluminum, plastic, and primed metal panels. The coated films were removable, without tears forming in the coating system on removal. Residues on the substrate were no longer present.

Figure 3:
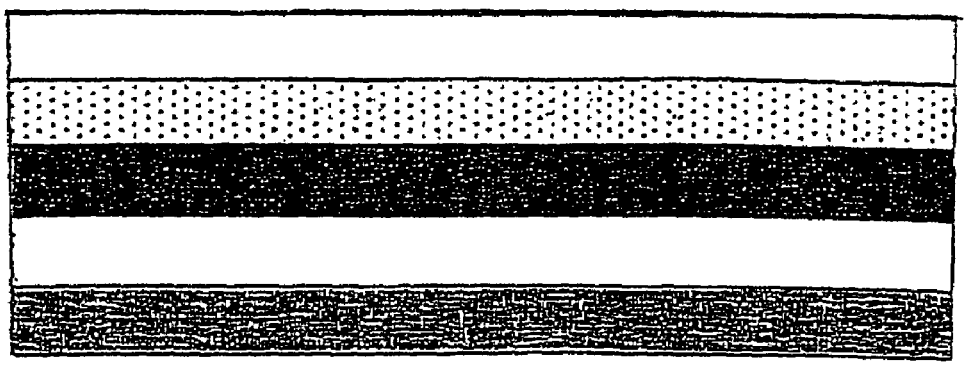
FIG. 3 shows a structure of an inventively coated film having particularly good thermoforming properties.

The structure depicted in FIG. 3 shows a polypropylene film 1 50 μm thick, a UV clearcoat 2 40 μm thick, a color layer 3 30 μm thick, an adhesive 4, and a film 8 500 μm thick. In accordance with the invention, Luran S was used for this.

This coated film was used to conduct thermoforming tests. After very good drying of the assembly, the system was readily formable with retention of the surface quality. Gloss, metallic, and color flop effects were unaffected by the forming. Formed parts can be injection backmolded or foam-backed, in accordance with the invention. In this case the protective film is preferably not removed until after forming and radiation crosslinking. The advantage of the present invention is therefore that the surface is protected from scratching during transport and processing by the protective film. The protective film has the further advantage that there is no oxygen inhibition on UV crosslinking.

Figure 4:
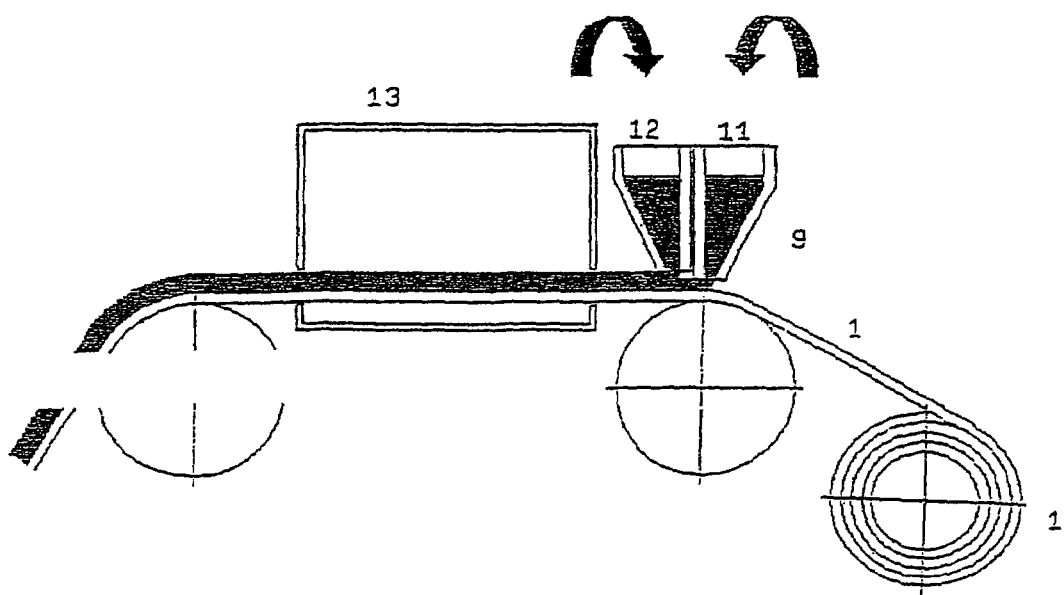
FIG. 4 depicts an application method for producing the inventively coated films.

FIG. 4 depicts by way of example the production of the inventively coated films. The carrier film 1, supplied on a roll, is guided beneath a predosed casting system 9. In the example according to FIG. 4 this system 9 includes the stations 11 and 12. By way of station 11 the clearcoat 2 is supplied via station 12 to the colorcoat 3. First of all the clearcoat 2 goes onto the film 1 and by way of station 12 the colorcoat 3 is applied simultaneously, so to speak, wet-on-wet. Film and paint layers are then passed through a drier 13. The formation of bubbles observed from a wet layer application of 30 μm up, as a result of excessively rapid solvent release in the drier, was eliminated by adapting the temperature in the drying tunnel and by adding 10% of butyl acetate (high boiler) to the acetone solution of clearcoat.

As an alternative the casting system may also be composed of two casting heads in series but spatially separate. The first caster applies the clearcoat layer to the film. Directly, in wet-on-wet process, the topcoat layer is applied beneath the second casting head. The clearcoat layer is applied using KRRC processes or, preferably, predosed casters or what are called blade coaters. The topcoat layer is applied using pre-dosed casters or, preferably, extrusion casters, with a spreader lip to smooth the coating.

Irrespective of whether a casting system according to item 9 in FIG. 4 or a system with separate casting units is used, it is necessary to ensure that no mixing takes place between the boundary layers. To this extent the two casting methods described guarantee, in the case of wet-on-wet application, the absence of mixing of the clearcoat layer and of the topcoat layer.

After the drier, the coated film is supplied for further processing.

The invention claimed is:

1. A film comprising a carrier film coated with at least two paint layers, wherein the carrier film is coated with at least one first paint layer, which is radiation-curable, and the first paint layer is coated with at least one second paint layer, which is curable at least partly without radiation, and wherein an adhesive layer has been cast, laminated or transferred onto the second paint layer.

2. The film as claimed in claim 1, wherein the second paint layer is curable thermally and by radiation.

3. The film as claimed in claim 1, wherein the first layer is an unpigmented clearcoat layer.

4. The film as claimed in claim 1, wherein the second paint layer is a pigmented topcoat layer.

5. The film as claimed in claim 1, wherein the first and the second paint layers are curable by UV radiation.

6. The film as claimed in claim 1, wherein the first paint layer has a thickness of 1 μm-400 μm and the second paint layer has a thickness of from 10 μm to 60 μm.

7. The film as claimed in claim 1, wherein the adhesive properties are adjustable by preliminary crosslinking with actinic radiation.

8. The film as claimed in claim 7, wherein the adhesive is curable by UV radiation.

9. The film as claimed in claim 6, wherein the thickness of the adhesive is 4 μm-20 μm.

10. The film as claimed in claim 1, wherein the carrier film is formable and thermally stable.

11. The film as claimed in claim 10, wherein the carrier film comprises polypropylene.

12. The film as claimed in claim 10, wherein the carrier film has a thickness of from 40 μm to 100 μm.

13. The film as claimed in claim 10, wherein the carrier film has a thickness of from 50 μm to 70 μm.

14. The film as claimed in claim 1, wherein one or more further films have been applied to the adhesive layer.

15. The film as claimed in claim 14, wherein one of the further films is a reinforcing sheet having a thickness of from 25 μm to 50 μm.

16. The film as claimed in claim 14, wherein to produce a thermoformable assembly a further film with a thickness of $\leq$1000 μm is applied to the adhesive layer.

17. A process for producing the film as claimed in claim 1, wherein the first and the second paint layers are applied to the carrier film by approximate simultaneous coating in a wet-on-wet application process and subsequently the solvent is removed from this system by thermal drying.

18. The process as claimed in claim 17, wherein an adhesive-coated release film is laminated or transferred onto the second paint layer.

19. A substrate coated with the film as claimed in claim 1, wherein the substrate is at least one of steel, aluminum or plastic.

20. A process for coating a substrate comprising, coating a steel, aluminum or plastic substrate with the film as claimed in claim 1.

* * * * *